(12) United States Patent
Srinivasan et al.

(10) Patent No.: US 9,817,846 B1
(45) Date of Patent: Nov. 14, 2017

(54) CONTENT SELECTION ALGORITHMS

(71) Applicant: Amazon Technologies, Inc., Reno, NV (US)

(72) Inventors: Sriram Srinivasan, Seattle, WA (US); Houssam Nassif, Seattle, WA (US); Vijai Mohan, Seattle, WA (US); Vishwanathan Swaminathan, Saratoga, CA (US); Mitchell Howard Goodman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 331 days.

(21) Appl. No.: 14/639,109

(22) Filed: Mar. 4, 2015

(51) Int. Cl.
 *G06F 17/00* (2006.01)
 *G06F 17/30* (2006.01)

(52) U.S. Cl.
 CPC .... *G06F 17/30256* (2013.01); *G06F 17/3053* (2013.01); *G06F 17/30867* (2013.01)

(58) Field of Classification Search
 CPC .. G06F 3/01; G06F 17/30864; G06F 17/3053; G06F 17/3005; G06F 17/30058
 See application file for complete search history.

(56) References Cited

U.S. PATENT DOCUMENTS

2016/0147892 A1* 5/2016 Gilbert ............. G06F 17/30867
 707/738

* cited by examiner

*Primary Examiner* — Truong Vo
(74) *Attorney, Agent, or Firm* — Hogan Lovells US LLP

(57) ABSTRACT

The arrangement and selection of digital content to present to a user can be based upon criteria such as profitability or interest to a user. The selection can also be made to ensure that a diversity of item content is presented. The selection can utilize various rules or policies for diversity at the category level or item feature level, among other such options. In addition to selection diversity, the placement of item content displayed can satisfy various diversity criteria in order to ensure diversity of display as well.

18 Claims, 9 Drawing Sheets

CONTENT SELECTION ALGORITHMS

BACKGROUND

Users are increasingly utilizing electronic devices to research, locate, and obtain various types of information. For example, users may utilize a search engine to locate information about various items, such as items offered through an electronic marketplace. While traditional search involved reviewing text results, searches involving items with a visual aspect may present image-based, or at least image inclusive, search results. If comparing items such as dresses, for example, such an approach enables a user to compare images of different dresses to determine which dresses are most visually appealing or otherwise of interest to the user. Many of these conventional approaches require a user to input a query or navigate to a location from which relevant content can be obtained. It thus can be difficult to present content to a user that might be of interest to a user, but does not require such a manual process on the part of the user. Further, providing the user with content that is more likely to be of interest to the user can result in higher profitability or other favorable results for the provider of that content.

BRIEF DESCRIPTION OF THE DRAWINGS

Various embodiments in accordance with the present disclosure will be described with reference to the drawings, in which.

DETAILED DESCRIPTION

Figure 1A:
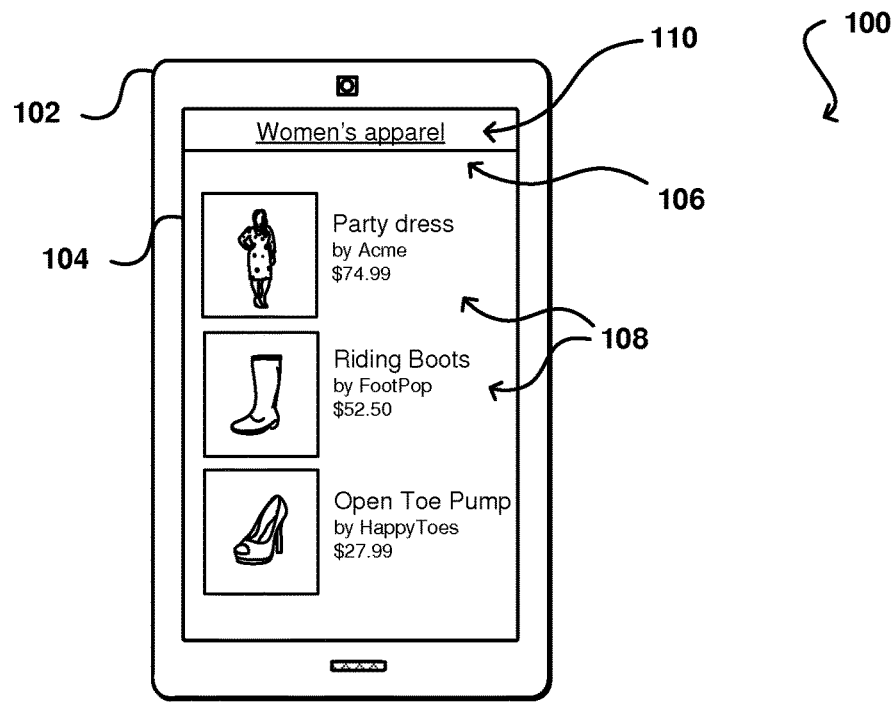
FIGS. 1A and 1B illustrate examples of content for various items that can be presented to a user in accordance with various embodiments.

Systems and methods in accordance with various embodiments of the present disclosure may overcome one or more of the aforementioned and other deficiencies experienced in conventional approaches to determining content to provide to a user. In particular, various embodiments attempt to determine the selection and/or ranking of items to display to a user based at least in part upon the probabilities of the user being interest in those items, as well as the likely amount of profit to be obtained for displaying content relating to those items. For example, user behavior with respect to various items can be determined in order to calculate a probability, based at least in part upon values of features of items presented to a user, that a user will view content with respect to a specific item and/or make a purchase or otherwise enter into a transaction with respect to that item. It can be desirable to rank items that the user will be more likely to view and/or purchase higher than other items, in order to improve the user experience and help the user more quickly locate items of interest. In addition to selecting item content for display based upon interest and likely profit, various diversity criteria can be used to ensure that content for a variety of types of item having different item feature values are displayed, and the items can be selected in such a way that a user receives a different selection of items upon each view. In at least some embodiments, advertisements relevant to the content can be blended in with the content as well, with the ad selection being based upon factors such as profitability and diversity as well. Such an approach can improve the user experience by enabling the user to instantly obtain information for multiple items that are likely to be of interest to the user upon accessing a website or other grouping of content, improving the user's overall impression of that site.

In addition to improving the user experience, showing content for items that are more likely to result in views and/or transactions can improve the revenue for the provider of the content, or other such party or entity. In addition to using the above-referenced probabilities, a provider can improve profitability by considering the likely resulting profit for each item that is displayed (or otherwise presented) to the user. For example, the profit for a given item can be multiplied by the probability of the user purchasing that item, if shown content relating to that item, in order to determine the likely profit for displaying that item content. The profit may not only include conventional costs such as cost to obtain and sales price, for example, but may also consider factors such as cost of storage for the item. Further, if the item corresponds to an advertiser that is willing to pay for each view or access of content for an item, that ad revenue can be considered as well, which can be multiplied by the probability of a user viewing the item content, if displayed an option to view the item content, to obtain a likely amount of ad revenue for displaying the item. The probable ad revenue and purchase profit for each item can then be totaled as a likely profit for each item if content for that item is displayed, which can be used to select and/or rank items for which content is to be displayed to a particular user. As additional data for the user is gathered, such as through the user interacting with content having specific feature values, the rankings can be updated accordingly. The rankings and selection can be used to determine the content to present to a user, and the arrangement of that content, which can improve the overall user experience while increasing profit for the provider of that content.

Various other functions and advantages are described and suggested below as may be provided in accordance with the various embodiments.

FIG. 1A illustrates an example situation 100 in which an interface on a display screen 104 of a computing device 102 might display content to a user per conventional approaches. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, a user has navigated to (or otherwise arrived at) a specific category page 106, which includes content for several different items 108. Other approaches to arriving at such a display of content can be utilized as well, such as entering a search query that causes a set of search results to be displayed on the display screen, etc. Various other approaches can be used to obtain a similar set of results, or similar display of content, such as by the user navigating to a page corresponding to that type of content.

While such approaches can be very useful and beneficial for users in many instances, there are ways in which the exposure of the user to content can be improved. For example, in a search context the user must search for a specific type or category of item, and must generally know the right term(s) to be able to obtain the corresponding content. For many users, an experience more akin to window shopping might be desirable, where a user can view items that might be of interest to the user, regardless of specific type or category in at least some embodiments, and view or obtain information on anything that catches the user's eye. Further, the user might want to be able to view content that is more likely to be of interest to the user than a category or type of items, where items are typically arranged by price, rating, or other criteria that are not necessarily tied into the particular preferences of the user. Similarly, the ability to display items that the user is likely to view and/or purchase can help the provider of the content, as the profit and/or revenue to the provider will increase if items of greater interest to the user are prioritized in the presentation of content. Further still, the profitability of providing the content can be considered in order for the provider to show items that are of interest to the user while also attempting to maximize the profit per item, which can improve provider profits while enabling the provider to offer lower costs to the customers than otherwise might be possible.

Figure 1B:
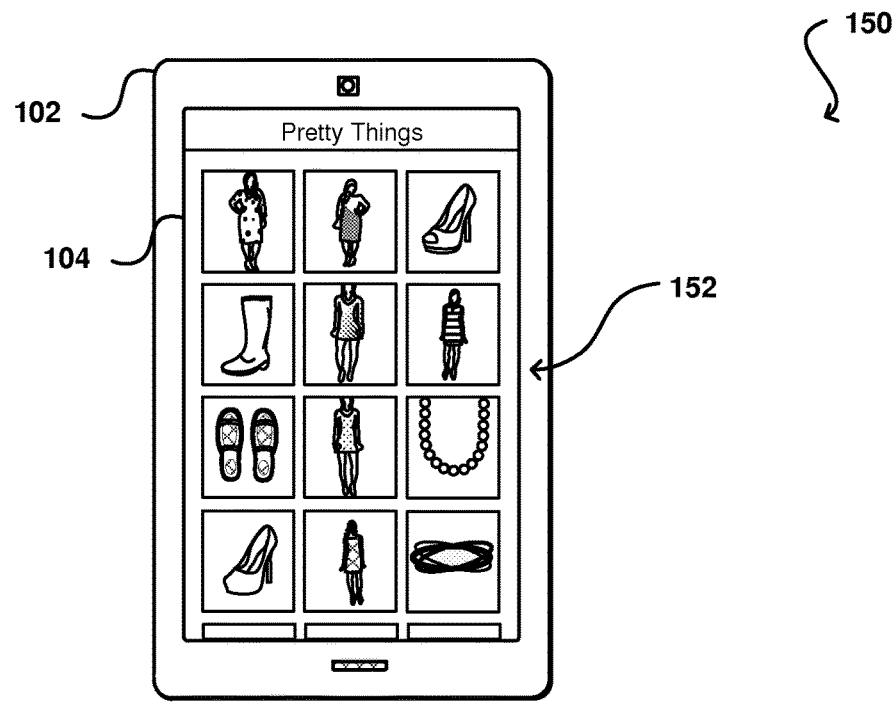

Systems and methods in accordance with various embodiments can address these and other concerns by providing an image-based search experience that enables users to quickly scan through content relating to items that are likely to be of interest to the user. Further, such an approach can improve the likelihood of clicks, purchases, and revenue to the provider of that content. The situation 150 illustrated in FIG. 1B provides an example of one such interface that can be utilized in accordance with various embodiments. In this example, the user has selected an option 110 to obtain such an experience, as illustrated in FIG. 1A, although in some embodiments the user might be able to directly access or be automatically redirected to such an experience. For the selected experience, a set of content is determined to be of interest to the user based upon information known about the user and the content. This can include, for example, a likelihood of the user "clicking on" or otherwise selecting one of the images 152 to obtain further information about the item represented in the image. This can also include a likelihood of the user consuming (i.e., purchasing, renting, downloading, or otherwise obtaining) the item represented in the image. As discussed later herein, these probabilities can be based upon information such as past view or purchase history of that user, as well as information about features of the items represented in the images, among other such options. The probabilities can be used to rank or otherwise order the items such that items that are more likely to be purchased, or at least viewed, by the user are presented first, or at the top of the images in the figure, in order to enable the user to more quickly and easily locate content of interest.

In addition, the profitability of these items can be considered such that the ordering can be set to increase the likely profit to the provider as well. For example, the probability of a purchase can also take into account the amount of revenue or profit that would be obtained through that purchase. Similarly, if an item is a sponsored or advertised item that will generate ad revenue for the provider upon the user selecting to view information about that item, the revenue generated from such a view can also be considered. Other information affecting revenue and/or profitability can be considered as well, such as the volume of space occupied to store the item and the accompanying cost of that volume. Thus, the images can be ordered so as to favor both items that are very likely to be of interest to the user while generating a reasonable profit for the provider (or other appropriate entity). As mentioned, the improved profitability of the provider can have benefits for the user such as lower overall prices and/or a higher quality of service, etc.

Figure 2A:
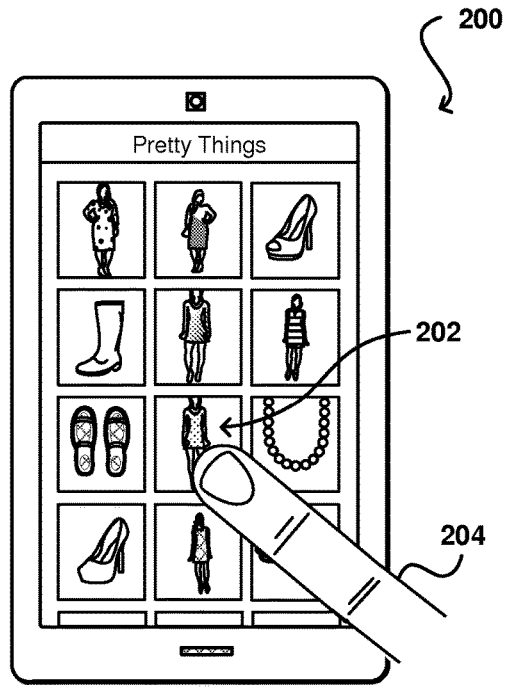
FIGS. 2A, 2B, 2C, and 2D illustrate stages of a process for determining and/or updating probabilities associated with a user that can be utilized in accordance with various embodiments.

In order to be able to provide such an offering that is at least someone personalized for a user, some information needs to be obtained about how likely users, and in particular that user, are to click on or purchase an item represented in one of the images. One way to obtain this information is to monitor the activity of users with respect to various content, and attempt to predict the actions of those users with respect to related content, such as content having one or more similar features. For example, in the situation 200 of FIG. 2A a set of images is displayed on a computing device, where each of those images includes a representation of a product offered for sale. It should be understood, however, that the images can relate to various other types of content as well, and items offered for purchase are merely an example for purposes of discussion. Further, although not shown there can be ways to filter the items shown or select categories or types of items, among other such options. If the user is interested in an item represented in an image 202, the user can select the image 202 using a finger 204, or other such selection mechanism as known in the art, to cause that image to be selected via the computing device. In this example, the image 202 selected corresponds to a dress offered for sale through an electronic marketplace.

Figure 2B:
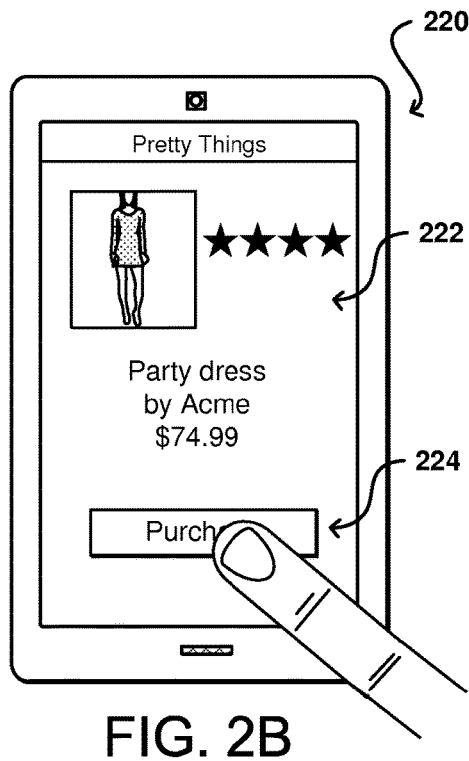

The selection of the image 202 causes a page of information 222 to be displayed on the computing device, as illustrated in the example situation 220 of FIG. 2B. The selection of the image can, if the image corresponds to an advertised item, result in revenue for the provider of the content (i.e., website). Such a model is often referred to as a "cost per click" or CPC model, wherein an advertiser agrees to (or bids on) an amount to be paid to the provider in response to a user selecting or "clicking" on content corresponding to the advertised item, which then causes additional related information to be displayed or otherwise provided to the user. In some embodiments a cost per impression model can also be utilized, wherein the amount of revenue generated simply by displaying the image to the user, regardless of whether the user selects the image, can be considered in the ordering or ranking of the items. Other mechanisms for electronic content advertising, and further details on these mechanisms, are well known in the art and, as such, will not be discussed in detail herein. Thus, one measure of the likely profitability of displaying an image to a user can be the amount of advertising revenue for displaying the image, along with the amount of revenue generated in response to the user selecting the image multiplied by the probability that the user will select the image.

Figure 2C:
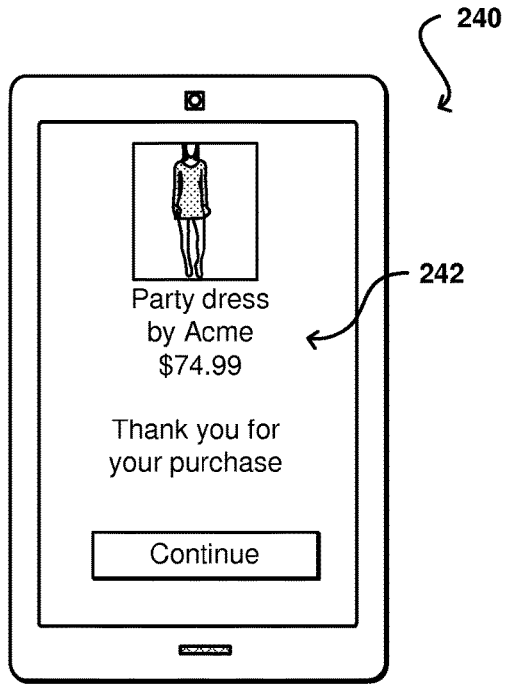
Figure 2D:
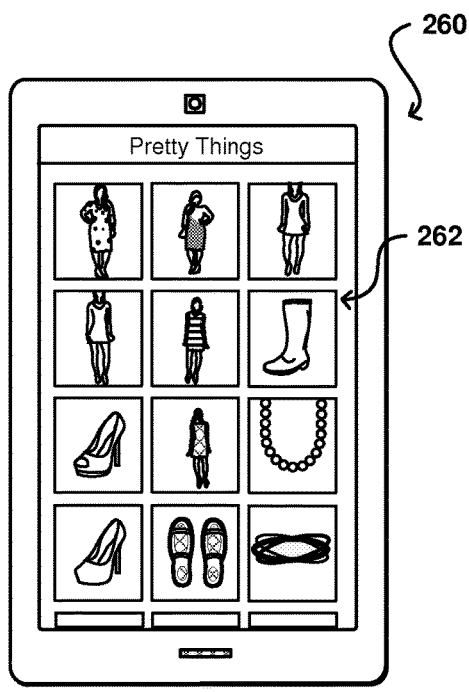

In the situation 220 of FIG. 2B, the user selects an option 224 to purchase the item described in the content. The purchase of an item is often referred to as a "conversion" in e-commerce vernacular, where a visitor to a website has been "converted" to a paying customer, or a view has been converted into a transaction, etc. By tracking the conversions for a customer (or type of customer, group of customers, etc.) a content provider can determine the types of items a user is likely to purchase based on past purchase history, and can use this to recommend other items to those users. As illustrated in the example situation 240 of FIG. 2C, the user has purchased the dress, which will result in information about the transaction being stored for the user, and revenue from the purchase being generated for the provider (or other appropriate entity). In this situation where the user has caused new click and conversion data to be obtained, that information can be used to update the probabilities for the user for certain types of items, or features of those items, which then can be used to select and/or re-rank a new set of item images 262 to be displayed to the user, as illustrated in the example situation 260 of FIG. 2D. In this set, an image for the item that was purchased is no longer displayed, although for certain types of items and/or certain situations the image might still be displayed where an additional purchase might occur, etc. A different selection and ordering of images is presented, with respect to the selection and ordering of FIG. 2A, based at least in part upon the updated click and conversion data. It should be understood that other information can be used to update the ordering and selection as well in light of the teachings and suggestions contained herein.

Figure 3:
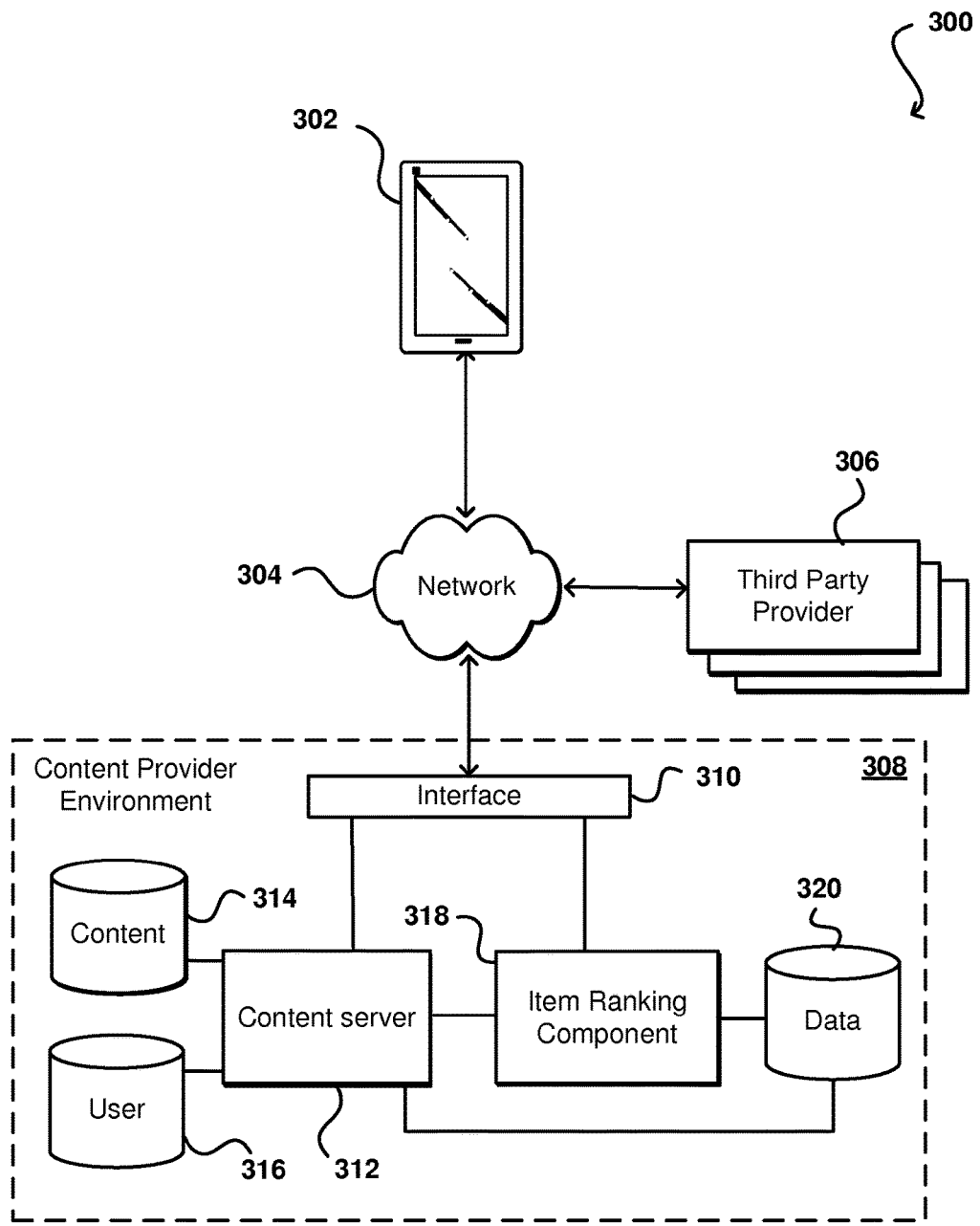
FIG. 3 illustrates an example system that can be used to determine content to provide for viewing by a user that can be utilized in accordance with various embodiments.

FIG. 3 illustrates an example environment 300 that can be used to implement aspects in accordance with various embodiments. In FIG. 3, a client computing device 302 can submit a request for content across at least one network 304 to be received by a content provider environment 308. In this example, a call received to the resource provider environment 308 can be received by an interface layer 310 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content servers 312, which can obtain the content from a content data store 314 or other such repository to be sent back across the network(s) to the computing device. In some embodiments, information for the request might also be compared against user data in a user data store 316 or other such location do determine, for example, whether the user has access rights to that content. In one example, the content can include a plurality of images to be displayed as part of a set of search results or set of potential items of interest, although various other types of content and uses for images can be utilized as well within the scope of the various embodiments.

In some cases, a request received to the content provider environment 308 might be from another entity, such as a third party image provider 306. As discussed previously, such providers may provide images to be displayed to users as part of, or along with, the served content. The interface layer can determine the type of request and cause information to be forwarded to an image processor 318, ranking component, or other such element, which in some embodiments can cause the images to be stored to an image data store 320 or other appropriate location. Any information associated with the images, such as a description or identification of one or more features of the items represented in the images, can also be provided and stored in the data store 320. In at least some embodiments, information about features of the items can be determined through components of the content provider environment, or otherwise determined. Further, in at least some embodiments images that are approved to be served as content to a user can be transferred to the content data base 314 or another appropriate location. In situations where content streams are computed offline, as discussed elsewhere herein, the stream data can potentially be stored in the content repository 314 or the data repository 320, which can be accessed by the content server in order to select and/or provide item and/or ad content to the computing device. The content server 312 can then blend in advertisements or otherwise modify the stream, although in other embodiments such functions can be performed by a third party provider 306 or other such entity.

When a set of images, or other content, is to be provided to a user, the content server 312 in this example can contact an item ranking component 318, or other such system or service, in order to determine which images are to be displayed, and in what order. The item ranking component can receive information such as a user identifier or session ID in order to determine which probabilities to use in determining the selection, although various other types of information can be used as well as discussed and suggested elsewhere herein.

In one example, a page of content might display images for apparel items that the user can purchase. In order to determine which of the items the user is most likely to view or purchase, the item ranking component can look at data for that user with respect to features of various items for which data has been obtained. This can include both data obtained across users and data obtained for a particular user. For example, the content provider might have some data about a specific feature with respect to a user, but that data might be limited. If the data is brand, for example, there might be data with respect to some of the brands the user has viewed, purchased, ignored, or otherwise had some interaction, but there might also be other brands for which there is no data for that user. Accordingly, at least some level, weight, or amount of probability can be utilized that reflects the probability of an average user, or users with at least some aspects in common with the current user, with respect to a particular brand. This helps the user to discover brands that the user might not have encountered previously. Further, the blending of aggregated data for multiple users with the actual data for a specific user provides many additional data points for use in determining a probability of a user interacting with specific content. Various other features and aspects can be utilized as well as discussed elsewhere herein.

Along with the probabilities for the user, the item ranking component 318 can obtain revenue, profit, and/or other financial data for the items to potentially be displayed to the user. This can include financial data from a data store 320 or other such location. The item ranking component can consider information such as the amount of profit that would be generated through the sale of each item, the amount of ad revenue for a click or selection by the user, a cost to store the item, and/or other such data. The item ranking component can also look at the probabilities and the financial data for the various items to determine which items to display to the user, and the order in which to display those items, based thereon. This can include, in some embodiments, the items most likely to be viewed and/or purchased by the user, while in other embodiments can include the items most likely to generate profit for the provider, supplier, or other such party based at least in part upon the items most likely to be viewed or purchased along with the relevant profit for each.

Once a ranking and/or selection is determined, and any diversity criteria are satisfied as discussed herein, the data can be passed to the content server 312 in this example, which can generate the appropriate code or otherwise cause the corresponding images to be provided in content for the user. This can include, for example, generating HTML to be rendered in a browser application on the client device to enable images for the items to be displayed in an arrangement based at least in part upon the determined ranking. In some embodiments a diversity component can be part of, or installed in, the content server, while in other embodiments it can be a separate component or service that may be called by the content server, among other such options.

As mentioned, it can be difficult to gather enough information about specific products for specific users to generate accurate probabilities. While data can be aggregated across multiple users in order to determine average probabilities across users, or maybe certain types of users, this still will not provide optimal probabilities for a specific user in many instances. Accordingly, approaches in accordance with various embodiments instead attempt to obtain or track data for a user with respect to a plurality of types of features, and use this data to attempt to determine probabilities for that user with respect to other items based on the values of those features for those items. While the term "features" is used herein, it should be understood that values can be determined for various properties or other aspects that might be used to distinguish one item from another, as should be apparent to one of ordinary skill in the art in light of the teachings and suggestions contained herein. For example, one feature might be brand. A user might often buy items with Brand A, but never (or very infrequently) buy items with Brand B. Accordingly, items with a feature value of Brand A can have higher probabilities of view and/or purchase than items with Brand B. Thus, the user viewing or purchasing an item with a specific brand, from a plurality of possible brands, provides information about multiple item both having, and not having, the brand of interest. For a feature such as color, items with colors that the user purchases more frequently (whether in general or for a specific type of item) can have higher probabilities that items with other colors. Style can be another feature, as a user might always purchase shoes with flat heels and never high heels, such that items with high heels can have higher probabilities. As data is gathered for various values across various features, the accuracy of the probabilities can increase accordingly. The values in some embodiments also might decay or otherwise change in order to enable the probabilities to change over time as the user's preferences or tastes change.

When information for a new item is received, the feature values for that item can be determined and the probabilities predicted based on information known for that user for various features. It should be understood that not every item will have a value for every feature, and that some feature values for an item may not be available to the system, but the probabilities can be based at least in part upon the information available. An appropriate probability model, such as a beta-Bernoulli or Bayesian regression model, can be used to gather the values for the various features and generate the probabilities for both clicks and conversion for various items and/or content with respect to a user (or group of users, etc.). Such a model can also provide an uncertainty, or variance, which can be used to assist in the rankings of the various items. Different features might have different amounts of uncertainty in general, as a type of item or designer might have less uncertainty of view for a particular user than color or brand, etc.

Figure 4:
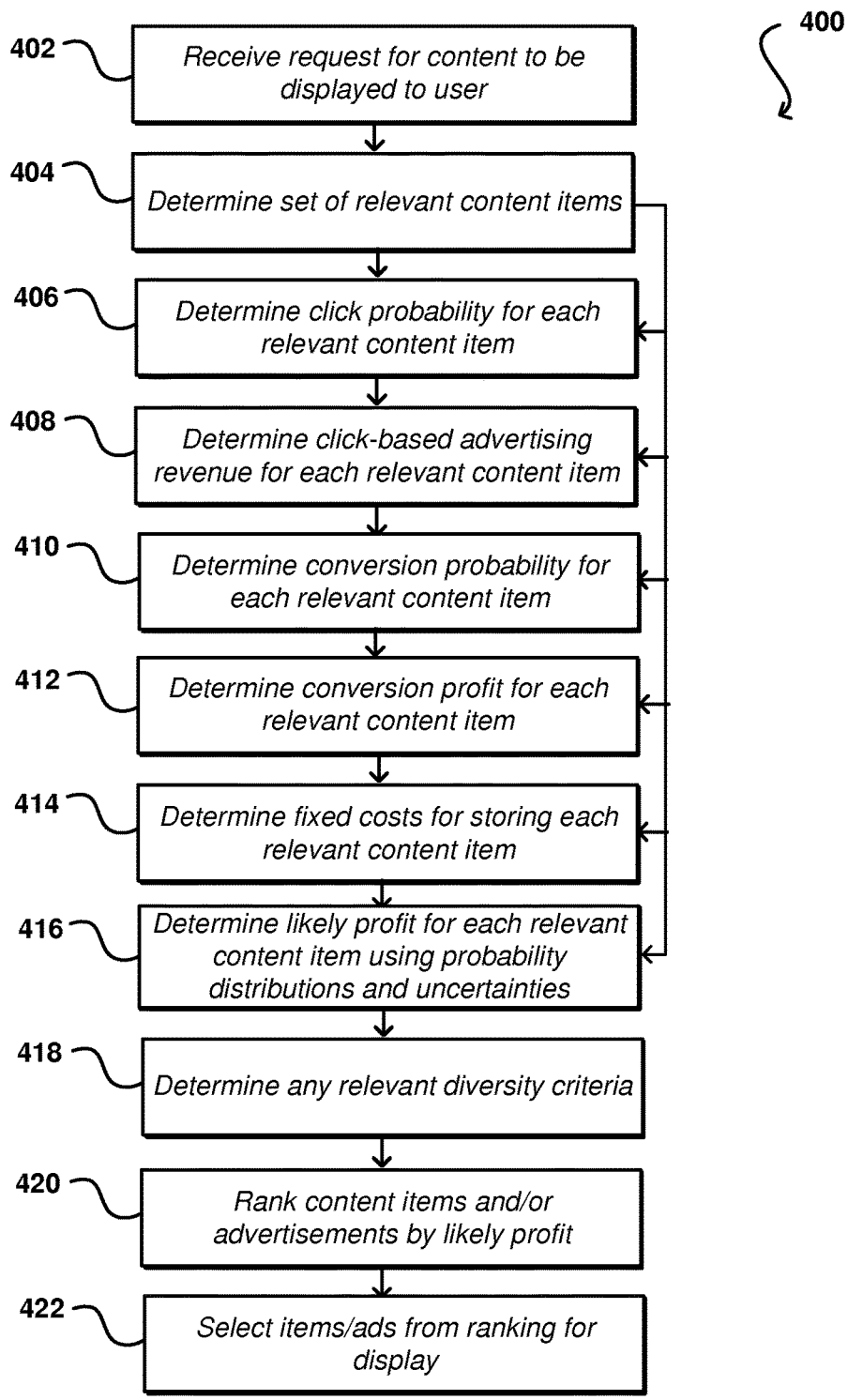
FIG. 4 illustrates an example process for determining content to be provided for a user that can be utilized in accordance with various embodiments.

FIG. 4 illustrates an example process 400 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request 402 is received for content to be displayed on (or otherwise presented via) a computing device, in this case for a particular user of the computing device. In response to the request, a set of relevant content items can be determined 404, where that set can, in different embodiments, include some or all of the content that could be provided in response to the request. This can include, for example, a set of images and related information for items in a category corresponding to the request.

In order to determine which of the images to display, and the order or arrangement in which to display those images, a number of pieces of information can be determined or obtained for at least a portion of the corresponding items. While the information is shown in the figure to be done sequentially for purposes of explanation, it should be understood that in many cases at least some of these steps will be done concurrently or in different orders as mentioned above. In this example, a click probability is determined 406 for each relevant item. As mentioned, this can include a click probability for the particular user or a general user, as may be based upon historical click data for the particular user and/or other users. For each item, a determination can be made 408 as to any advertising or other revenue that could be captured or received through the user clicking on an image or other content for a particular item. The projected ad revenue for displaying an image of the item to the user is then, in this example, the product of the ad revenue and the probability that the user will click on the respective image.

In addition, a conversion probability (or other such metric) can be determined 410 for each relevant item in order to determine the likelihood that the user would purchase (or otherwise consume or obtain) the item represented in an image if displayed. As with the click probabilities, this can be specific to a user or can apply to a type of user, for example, and can be based upon specific user data and/or aggregated data from multiple users with respect to that item, related items, items in that category, items with similar features, and the like. The conversion profit can also be determined 412 for each of those items, where the conversion data can be based upon information such as sales price, shipping fees, discounts, etc. As known for e-commerce, the amount of profit can depend at least in part upon the seller of the item. For example, the provider might offer the item for sale such that the profit is determined using the appropriate cost and revenue figures for the provider. If the item is instead offered by a third party vendor, for example, there might be a "contribution profit" or other amount of revenue that might be due the provider, as may correspond to a fixed amount or percentage of the sales price, among other such options. For advertising third party vendors, this can result in ad revenue for a click and contribution profit from a purchase.

Either as part of the conversion data or separately, a determination can also be made 414 for at least some of the items as to the fixed cost for storing each item. In some embodiments, this can be based at least in part upon the volume of storage space (i.e., in a warehouse for physical items or on a storage media for digital content) needed to store the item multiplied by the cost of that volume of space over a defined period. A measure of the profit for a given item can then be the conversion profit minus the fixed cost, among other such options. The likely profit for a conversion based on displaying an image to the user then can be determined 416, such as by multiplying the probability of the user clicking on an image for the item, in order to get to an option to purchase, multiplied by the probability of the user purchasing the item if given the option, times the net profit as determined by the contribution profit distribution minus the fixed cost. It should be understood in light of the present disclosure, however, that other factors can be used for such a determination, and factors such as the conversion probability distribution can be calculated to include the click probability distribution as well, among other such options. The probabilities can be determined in some embodiments by sampling from a beta distribution for each item, among other such options.

For example, in at least some embodiments an uncertainty value can be presented with the profit and/or probability data. For example, a first item might have a likely profit of $1, but an uncertainty of plus or minus $0.50. Thus, the profit range is from $0.50 to $1.50. If a second item only has a likely profit of $0.70, but the uncertainty is only plus or minus $0.10 (for a range of $0.60 to $0.80), it might be preferable in some situations to prioritize the second item over the first item, as even though the potential profit might be less the minimum anticipated profit is higher. Use of uncertainties also helps provide an inherent diversity of item selection, as if only anticipated profit is used to select items, it is likely that mostly very expensive items would be selected that are likely to have an associated high contribution profit. It is often the case, however, that these expensive items sell much less frequently, and lower value items are much more likely to sell such that when taking into account the uncertainty it might be more likely to make more profit by showing at least some of the lower value items with the higher value items.

In some embodiments, there can also be specific diversity rules or guidelines that can affect the way in which items are selected, ranked, or otherwise prioritized. For example, if a user is browsing in an apparel category that includes accessories, it is possible without diversity criteria that an algorithm selecting based primarily on profit would show mostly jewelry, designer handbags, and designer heels, for example, and would rarely show items such as shorts, socks, and other lower cost items. Similarly, if the apparel category has thousands of shirts but only a handful of watches, without diversity criteria it is possible that a user might very rarely see content for a watch or other such item, even if the user is interested in that type of item. While this might be desirable for some providers, such selection can turn off certain potential customers and it may thus be preferable in those situations to ensure that a mix of items is displayed. This can include, for example, ensuring that at least a certain percentage or number of items shown is from a first category, a second category, etc. For example, rules might indicate that shoes may make up at most 30% of the displayed item content, or that everyday clothing make up at least 25% of the displayed item content. This can include taking, for example, the appropriate number of highest likely profit items from each category. In order to improve diversity, however, a sampling of highly profitable items might instead be taken such that a refresh of the results by the user would likely return a different selection of item content. Thus, it can be desirable in at least some embodiments to determine 418 whether any diversity criteria exist, and apply those to the likely profit data results as appropriate. Further, diversity criteria can apply to features of items within a category (or across categories) as well, such that a certain brand of item is only displayed up to a certain number of times in a set, a minimum number of styles is displayed, etc. Various other diversity criteria can be applied as well as should be apparent to one of ordinary skill in the art in light of the teachings and suggestions contained herein. In at least some embodiments, there will be a tradeoff between diversity and profitability, so a provider can have the option of determining how to strike that balance, such as by setting caps, maximum or minimum item numbers, minimum profitability ranges, and the like. An example algorithm presents one parameter that determines the balance between meeting the given ideal category distribution and purely ranking according to estimated revenue. This parameter can be tunable and determinable based upon various criteria. Diversity can also be used to ensure the items are not grouped together when displayed, such that shoe images might be spread relatively evenly across the display as opposed to being bunched together, etc.

Once the estimated profit is determined for each item in this example, and any diversity rules or other criteria are applied, the items can be ranked 420, ordered, or otherwise selected based on estimated profit, diversity, and other factors discussed herein. At least a portion of the items, such as the highest ranked items (in general or in specified categories), can then be selected to have images or other related content provided for presentation (e.g., display, play, or projection) to the user, and can be caused 422 to be presented to the user. As mentioned, the selection can include sampling a highly-ranked (not necessarily highest) number of items in each of a set of categories in at least some embodiments. As mentioned, this can include arranging images on a page of content in order to enable a user to quickly scan content for a large number of items and locate items of interest to the user. Such a process has additional benefits for the provider, as fewer images will likely need to be displayed in order for the user to find an item of interest and session length reduced, which can help to reduce cost and bandwidth requirements to provide the content to users.

Figure 5:
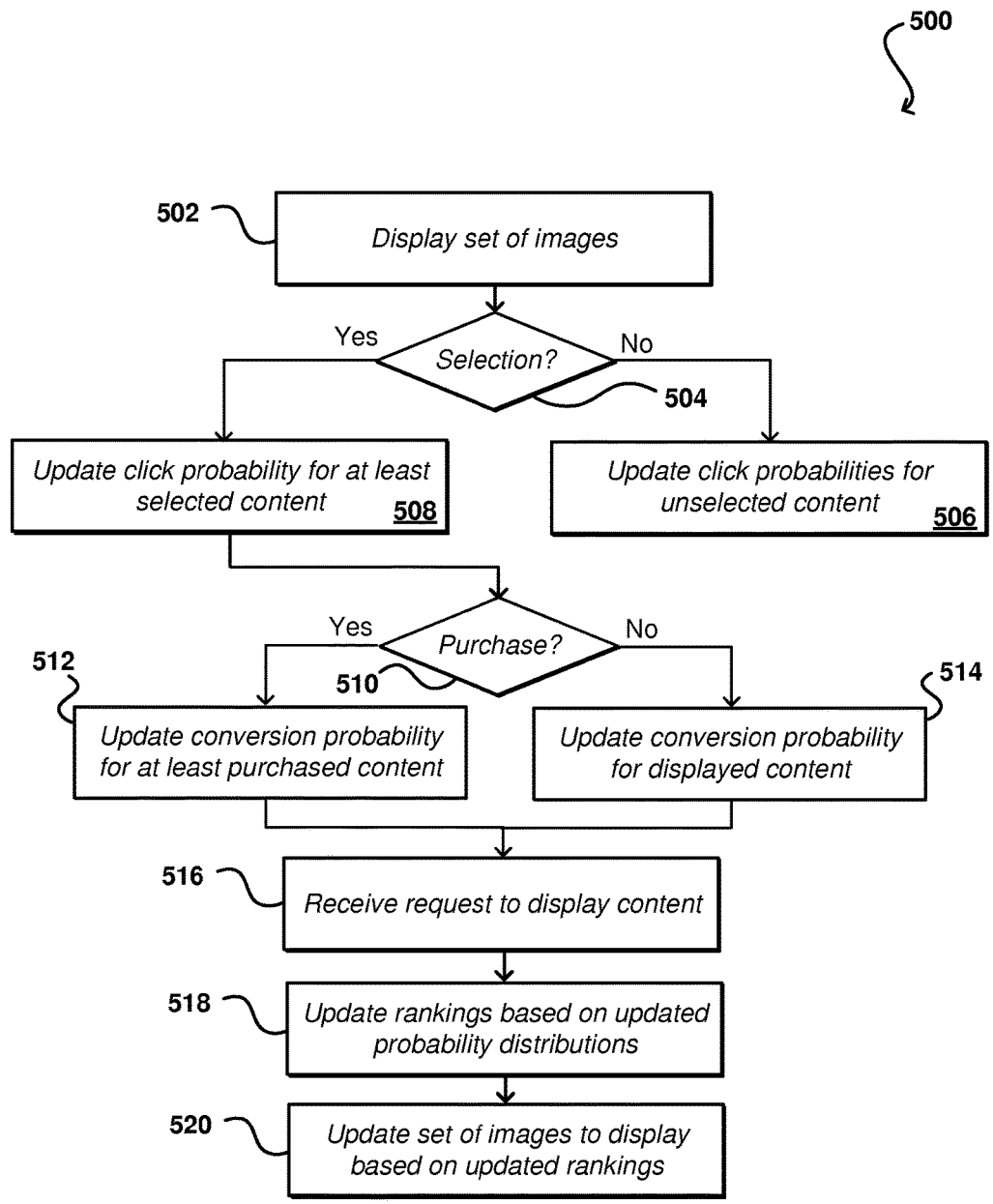
FIG. 5 illustrates an example process for updating probabilities associated with a user that can be utilized in accordance with various embodiments.

FIG. 5 illustrates an example process 500 that can be used to collect and/or update probability data for a user that can be utilized in accordance with various embodiments. In this example, a set of images (or at least a subset of the set) is displayed 502 on a computing device. If a selection is detected 504 with respect to one of the images, such as in response to a user clicking on or otherwise selecting a portion of the interface or display associated with that image, the click probability distribution data with respect to features of the selected content can be updated 506. This can include, for example, determining the values for various features (i.e., brand, color, size, style, etc.) associated with the item or content represented in the selected image, and causing data to be stored that represents the fact that the user selected an image associated with this content. If a selection is not made, click probability distribution data might be updated 508 for features of the content that was not selected, in order to indicate that the user did not select content with these features. In some embodiments, both will be done in order to update probabilities for both items that were and were not selected.

For the items that were selected for viewing or other access, a determination can be made 510 as to whether a purchase or other selection or transaction resulted with respect to the content. The corresponding conversion probability distributions for features of at least the purchased content can be updated 512 to reflect the conversion, although in at least some embodiments the probability distributions can also be updated 514 if the display does not result in a conversion. Based at least on this updated probability distribution data, when a subsequent request is received 516 for content to be displayed that includes similar images, the selection and/or ranking of the images can be updated 518 or otherwise recalculated or determined based on the most recent data, and the set of images displayed can be updated 520 (or generated anew based on the new rankings) in order to display the images according to the new rankings.

Figure 6:
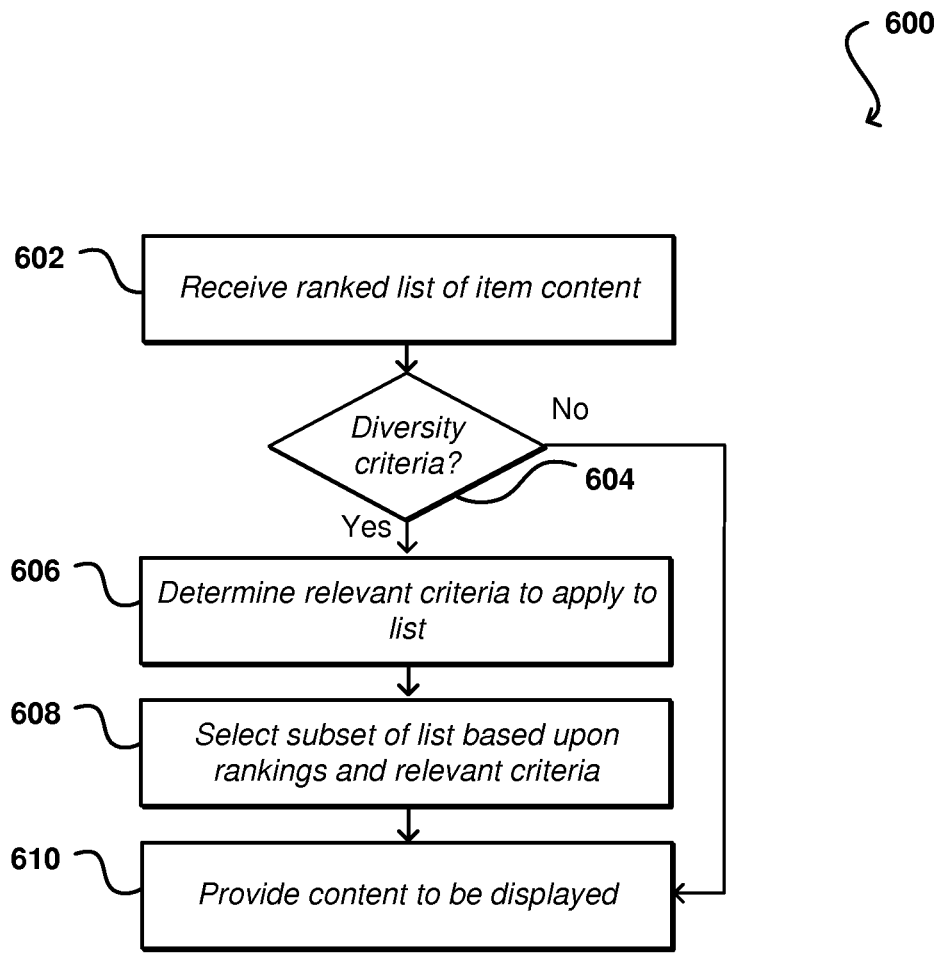
FIG. 6 illustrates an example process for applying diversity to a selection of item content that can be utilized in accordance with various embodiments.

FIG. 6 illustrates an example process 600 that can be used to apply diversity criteria in accordance with various embodiments. In this example, a ranked list of item content is received 602 or otherwise obtained, whether from a system in the same environment, a third party service, or other such source. If there are no diversity criteria 604 to be applied, the item content can be provided 610 for display based at least in part upon the ranking. As mentioned, the ranking can be based on anticipated profitability, but it should be understood that various other types of ranking can be used with diversity criteria a discussed herein. If diversity criteria exist, the relevant criteria for the received list can be determined 606. In some embodiments the same diversity criteria can apply to every list, while in other embodiments the diversity criteria can vary based upon any of a number of factors, such as the type of list, type of items in the list, type of user requesting content, information about the user, user preferences, provider preferences, marketing campaigns, and the like. For example, there might be different criteria for someone browsing music files than someone browsing apparel items. Further, a user who never buys shoes online might have a different set of diversity criteria applied than a user who buys primarily shoes, etc.

Once at least some of the appropriate diversity criteria are determined, at least a subset of the list of ranked items can be selected 608 based on the ranking information within the diversity criteria. As mentioned, this can include selecting or sampling a number of items in each of a set of different categories, items with specific features, and the like, as may be specified by the diversity criteria or other such rules or policies. Within a category, for example, the highest ranked items might be selected up to a number determined by the diversity criteria, for example, or a subset of the top-ranked items within a category might be selected, among other such options. In some cases multiple diversity criteria might apply, such that within a category only a maximum number of items with a specific feature value can be selected, such that the sampling can be based upon the highest ranked items in each category that satisfy all diversity criteria. It is also possible that the diversity criteria can be prioritized or weighted, such that any conflicts between diversity criteria can be resolved automatically. Once a selection of at least a number of items is made, content for those items can be provided 610 or otherwise specified for display (or other presentation) to a user and/or on a computing device.

Figure 7:
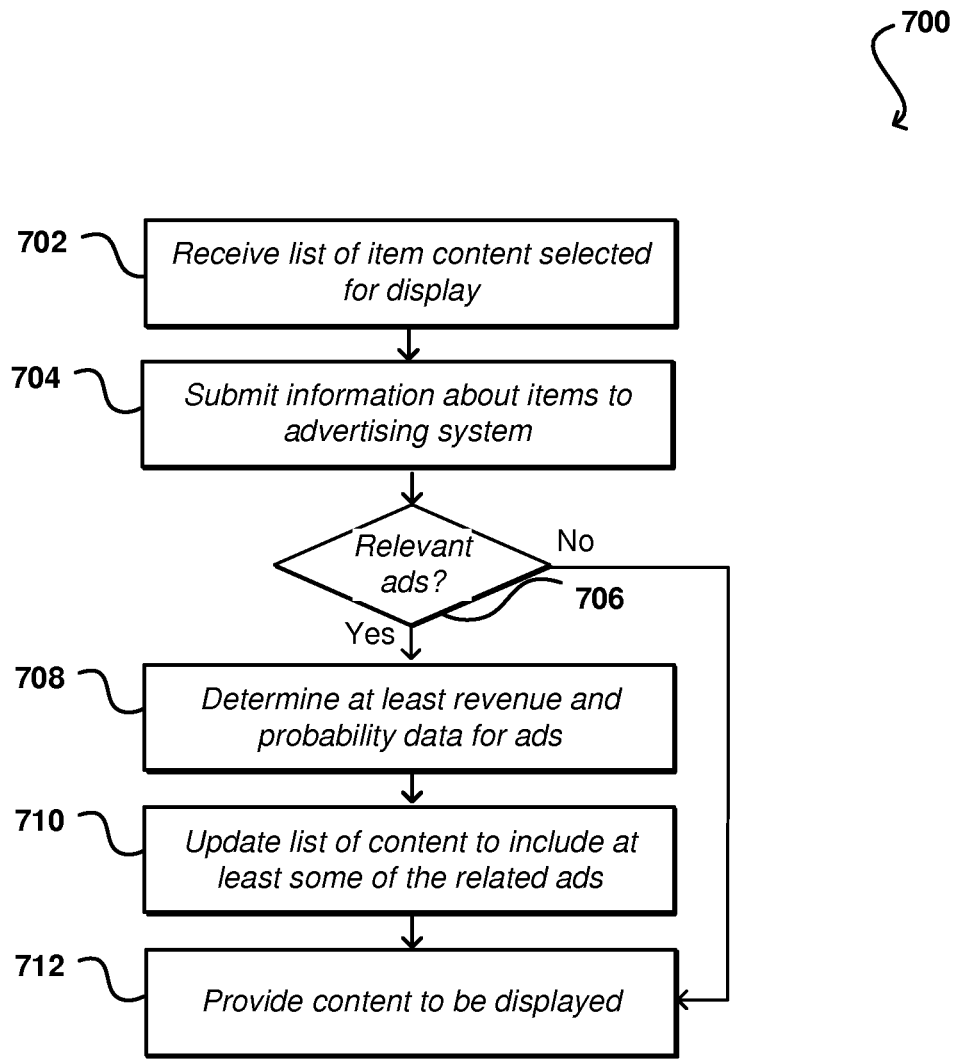
FIG. 7 illustrates an example process for including advertising with a selection of item content that can be utilized in accordance with various embodiments.

In some embodiments, third party advertisements or other advertisements that may not be directly related to an item purchasable via the provider can be included in the displayed content as well, as discussed herein. FIG. 7 illustrates an example process 700 for determining which advertisements to include in a selection of content in accordance with various embodiments. In this example, a list of item content is received 702 that has been selected for potential display to a customer or other such user. The items can be selected using any appropriate process and/or criteria discussed herein, and can be received from a system or component within the environment or a third party service, among other such options. In some embodiments, the advertising selections can be provided as part of a third party service to the content provider as well. In this example, information about at least some of the items in the list can be submitted 704 to an advertising system, either in the same environment or as an external service, etc. The information can include identifiers for the included items, feature values or criteria for at least some of the items, selection criteria for the list as a whole, or other such options. A determination can be made 706 as to whether there are any relevant ads to the selected content, such as may utilize any appropriate ad selection criteria known or used for such purposes. If no relevant ads are located, the list of item content can be used to select, specify, and/or provide 712 content to be displayed or otherwise presented via a computing device. If one or more relevant advertisements are determined, data including at least the anticipated revenue and probability of a click or view can be determined 708. The list of content then can be updated 710 (if appropriate) to include one or more of the advertisements. As discussed herein, the selection of ads to display can be based upon factors such as anticipated revenue, probability of click or view, diversity criteria, and the like. An identifier for each selected ad can be inserted into the list or additional content, or can replace some of the content previously identified in the list, among other such options. The decisions of which item content to replace with an ad can be based upon factors such as diversity criteria, as an ad for a shoe might be advantageously used to replace content for a shoe available for purchase, etc. Content for items and/or ads in the updated list then can be provided 712 or otherwise specified to be presented via at least one target computing device. Such an approach can allow for seamless blending of advertisements and content, where in at least some embodiments users can get a customized experience based on information know for those users.

As mentioned herein, the lists or selections of content can be determined on a per user and/or per request basis in various embodiments. In some embodiments, streams of items can be determined using specific criteria for each stream, and then users can be selected or assigned to receive one of the streams. In some embodiments, a user might receive a pre-determined stream of content until a sufficient amount of data is available to generate a custom set of content for that user. In such cases, an existing stream might be modified to include at least a few new items of content or a whole new list can be generated, among other such options.

Figure 8:
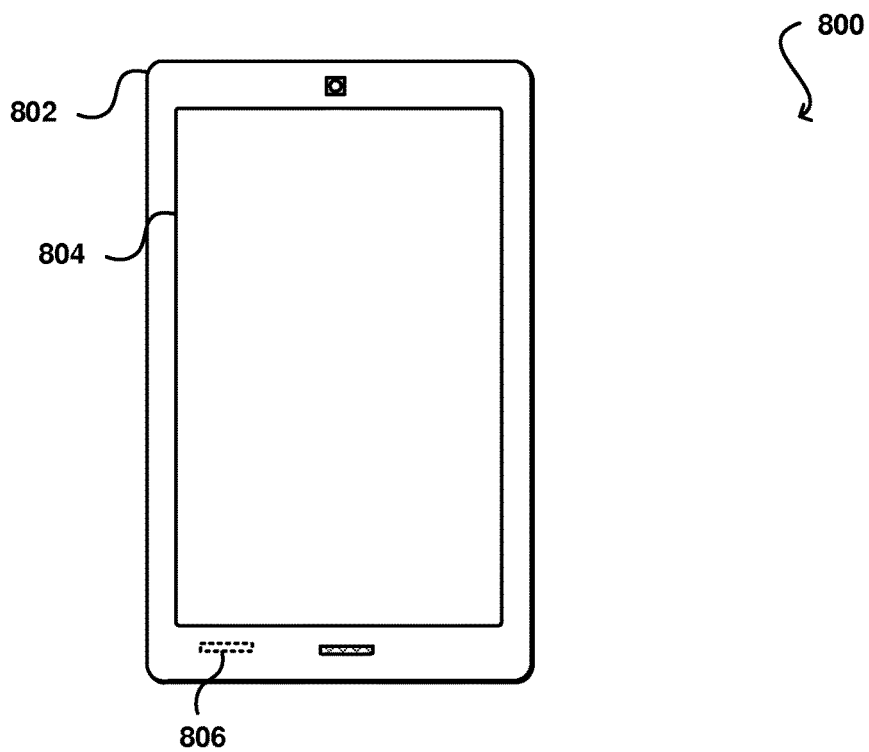
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
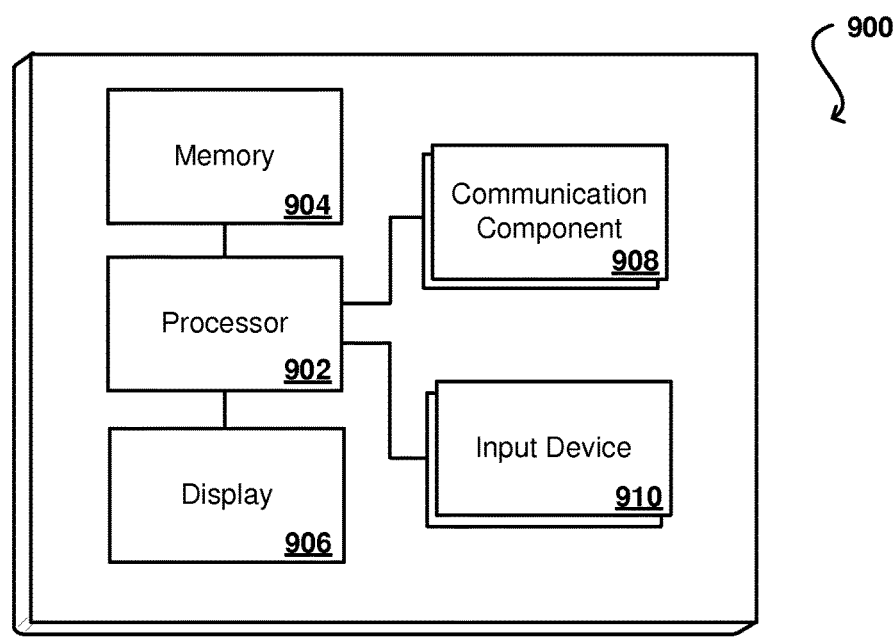
FIG. 9 illustrates an example configuration of components of a computing device, such as the device illustrated in FIG. 8.

In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
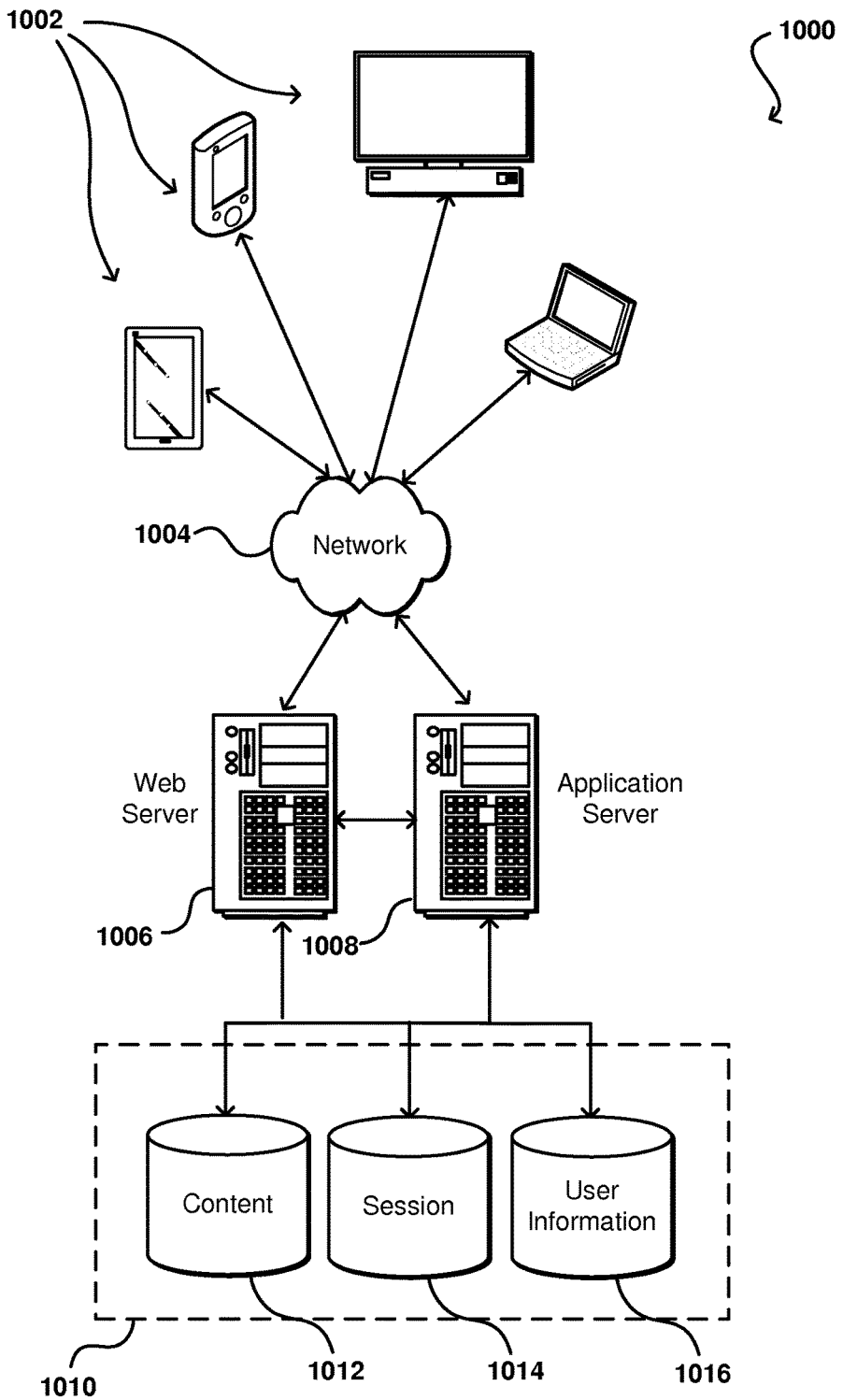
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory storing instructions that, when executed by the at least one processor, cause the system to:
   receive a first ordered list including information identifying a set of items, the first ordered list being ordered according to a respective profitability for each item of the set of items, each item corresponding to a respective category of a plurality of categories;
identify a user for the first ordered list, the user associated with item consumption data;
obtain a set of diversity criteria for the set of items based at least in part on the item consumption data, the set of diversity criteria including a respective diversity criteria for categories of at least a subset of the plurality of categories;
identify a subset of highest ranked items for each category having a respective diversity criteria;
select, from the subset of highest ranked items for each category having a respective diversity criteria, a number of items to satisfy the respective diversity criteria;
generate a second ordered list including information identifying at least the selected items, items of the second ordered list ordered based at least in part on a limit on grouping of related items specified in the respective diversity criteria; and
provide the second ordered list for displaying content, corresponding to at least a portion of the selected items of the second ordered list, on a computing device.

2. The system of claim 1, wherein the instructions when executed further cause the system to:
select additional highly-ranked items from the first ordered list up to a number of items to be included in the second ordered list, the additionally highly-ranked items not corresponding to a category-specific diversity criterion.

3. The system of claim 1, wherein the instructions when executed further cause the system to:
determine an ordering of items in the second ordered list according to at least one additional diversity criterion.

4. The system of claim 1, wherein the instructions when executed further cause the system to:
determine similar items from the first ordered list; and
select only up to a threshold number of the similar items for inclusion in the second ordered list.

5. A computer-implemented method, comprising:
under the control of one or more computer systems configured with executable instructions,
receiving a first ordered list including information identifying a set of items;
identifying a user for the first ordered list, the user associated with item consumption data;
determining at least one diversity criterion corresponding to the first ordered list based at least in part on the item consumption data;
selecting, from the first ordered list, a subset of the set of items that satisfies the at least one diversity criterion;
determining an ordering of the subset based at least in part upon the at least one diversity criterion;
generating a second ordered list according to the ordering and including information for the subset of items, items of the second ordered list ordered based at least in part on a limit on grouping of related items specified in the at least one diversity criterion; and
providing the second ordered list to a computing device capable of presenting content corresponding to at least a portion of the second ordered list.

6. The computer-implemented method of claim 5, further comprising:
determining at least one of a feature or a category for each item of the set of items; and
determining diversity criteria, of the at least one diversity criterion, that the respective item based at least in part upon the at least one of a feature or a category for the item.

7. The computer-implemented method of claim 5, further comprising:
removing, from consideration for the second ordered list, at least one item having at least one similar item feature with another item in the first ordered list.

8. The computer-implemented method of claim 5, further comprising:
determining a set of advertisements related to items in the first ordered list; and
selecting a subset of the set of advertisements for inclusion in the second ordered list.

9. The computer-implemented method of claim 5, further comprising:
determining a respective weighting for each diversity criterion of the at least one diversity criterion, the respective weighting indicating relative importance of the diversity criterion in case of a conflict between diversity criteria.

10. The computer-implemented method of claim 5, further comprising:
obtaining a set of feature selection data for a user of the computing device, the feature selection data indicating past user selection of items having a value for at least one item feature of a plurality of item features;
determining respective profitability for each item of a plurality of items, the respective profitability for each item determined in part by:
determining a selection probability of content for the item being selected by the user;
determining a transaction probability of the item being purchased by the user associated with the selection of the content;
determining the respective profitability based at least in part upon profit data for the item as modified by the selection probability and the transaction probability; and
selecting a subset of the plurality of items for inclusion in the first ordered list based at least in part upon the respective probability for each item of the subset.

11. The computer-implemented method of claim 5, further comprising:
selecting additional highly-ranked items from the first ordered list up to a number of items to be included in the second ordered list, the additional highly-ranked items not corresponding to the at least one diversity criterion.

12. The computer-implemented method of claim 5, wherein the at least one diversity criterion includes at least one of a maximum or a minimum number or percentage of items in the second list having at least one of a common item feature or a common category.

13. The computer-implemented method of claim 5, further comprising:
selecting a number of available items for a respective diversity criterion when an insufficient number of available items exists for the respective diversity criterion.

14. A non-transitory computer readable storage medium storing instructions that, when executed by at least one processor of a computing system, causes the computing system to:

receive a first ordered list including information identifying a set of items;

identifying a user for the first ordered list, the user associated with item consumption data;

obtain at least one diversity criterion corresponding to the first ordered list based at least in part on the item consumption data;

select, from the first ordered list, a subset of the set of items that satisfies the at least one diversity criterion;

generate a second ordered list according to the ordering and including information for the subset of items, items of the second ordered list ordered based at least in part on a limit on grouping of related items specified in the at least one diversity criterion; and provide the second ordered list to a computing device capable of presenting content corresponding to at least a portion of the second ordered list.

15. The non-transitory computer readable storage medium of claim 14, wherein the instructions, when executed by the at least one processor, further causes the computing system to:

determine at least one of a feature or a category for each item of the set of items; and determine diversity criteria, of the at least one diversity criterion, that the respective item based at least in part upon the at least one of a feature or a category for the item.

16. The non-transitory computer readable storage medium of claim 15, wherein each item has at least one value for at least one item feature of a plurality of item features, the plurality of item features including at least one of color, brand, designer, type of item, category of item, or style.

17. The non-transitory computer readable storage medium of claim 14, wherein the instructions, when executed by the at least one processor, further causes the computing system to:

order the first ordered list according to respective profitability, the respective profitability for each item determined at least in part by determining a respective contribution profit modified by selection probability and transaction probability for the item, based at least in part upon feature values for the item.

18. The non-transitory computer readable storage medium of claim 14, wherein the instructions, when executed by the at least one processor, further causes the computing system to:

determine an ordering of the subset based at least in part upon the at least one diversity criterion.

* * * * *